Nov. 25, 1952 A. F. TREES 2,619,355
SEEDER ATTACHMENT FOR VEHICLE BODIES
Filed May 15, 1950 5 Sheets-Sheet 1

INVENTOR.
ALONZO F. TREES
BY
Paul, Paul & Moore
ATTORNEYS

Nov. 25, 1952     A. F. TREES     2,619,355
SEEDER ATTACHMENT FOR VEHICLE BODIES
Filed May 15, 1950     5 Sheets-Sheet 2

INVENTOR.
ALONZO F. TREES
BY
Paul, Paul & Moore
ATTORNEYS

Nov. 25, 1952 A. F. TREES 2,619,355
SEEDER ATTACHMENT FOR VEHICLE BODIES
Filed May 15, 1950 5 Sheets-Sheet 3

INVENTOR.
ALONZO F. TREES
BY
ATTORNEYS

Nov. 25, 1952　　　　　A. F. TREES　　　　　2,619,355
SEEDER ATTACHMENT FOR VEHICLE BODIES
Filed May 15, 1950　　　　　　　　　　　　　5 Sheets-Sheet 4

INVENTOR.
ALONZO F. TREES
BY Paul, Paul + Moore
ATTORNEYS

Nov. 25, 1952  A. F. TREES  2,619,355
SEEDER ATTACHMENT FOR VEHICLE BODIES
Filed May 15, 1950  5 Sheets-Sheet 5

INVENTOR.
ALONZO F. TREES
BY Paul, Paul & Moore
ATTORNEYS

Patented Nov. 25, 1952

2,619,355

UNITED STATES PATENT OFFICE 2,619,355

SEEDER ATTACHMENT FOR VEHICLE BODIES

Alonzo F. Trees, Rockford, Iowa

Application May 15, 1950, Serial No. 161,953

5 Claims. (Cl. 275—8)

This invention relates to new and useful improvements in broadcast seeders, and more particularly to a novel seeder attachment adapted to be mounted upon the rear end of a vehicle body or box, and having means for drivingly connecting it to the usual power takeoff shaft of the tractor to which the vehicle is coupled.

It is well known that conventional grain and grass seeders, both the broadcast and drill type, because of their inherent construction and capacity are not conducive to fast or expeditious seeding. This is particularly true of grain seeders because of the relatively larger seeds. In grain growing sections of the country, large sections of land are often planted in wheat, or other grains, which may require hundreds of bushels of seed, and because of the limited capacity of conventional seeder hoppers, such hoppers require frequent filling, and usually the services of an attendant, which obviously increases the cost of planting a given field. It is therefore well known that conventional seeders have not been entirely satisfactory.

The novel seeder herein disclosed was developed primarily as a means for expediting the planting of seeds of various kinds and sizes, such as wheat, oats, rye, and small grass seeds, whereby such seeds may be expeditiously and uniformly distributed over the surface of the ground to assure uniform crop growth, and an object of the present invention is to provide a simple form of seeder attachment which may readily be mounted upon the rear end of a wagon box, whereby the wagon box may be utilized as a hopper for temporarily containing the seed as it is delivered to the seeder spreaders located at the rear of the vehicle body.

A further object is to provide a seed attachment of the class described having means for mounting it upon the rear end of a vehicle body, and comprising a pair of rotary spreaders having means for delivering seed thereto in controlled quantities, and whereby the seed may be uniformly scattered over the surface of the ground in varying quantities, depending upon the crop to be planted.

A further object is to provide a false bottom adapted to be placed in the bottom of a wagon box and having the opposed sides of its top surface sloping downwardly from the side walls of the box towards the center thereof, and merging into a longtiudinal trough extending from front to rear of the box, and a conveyor screw or auger being mounted in said trough and having means at the forward end of its supporting shaft for operatively connecting it to the usual power takeoff shaft of the tractor, and the rear end of said shaft being operatively connected to the seeder attachment so that when the apparatus is moving forwardly, and the feed screw is rotated, grain is discharged from the rear end of the box into suitable seed distributing spouts arranged to deliver the seed to the spreaders, which in turn broadcast the seeds uniformly over the surface of the ground.

A further object is to provide a seeder attachment comprising a pair of horizontally mounted spreaders adapted to be driven in opposite directions by a suitable drive having an operative connection with the shaft of the feed screw, whereby when said screw is operated to discharge seed from the rear end of the grain or wagon box, said spreaders are simultaneously rotated to uniformly scatter the seed over the surface of the ground.

A further object is to provide a seeder attachment comprising a housing adapted to be secured to the rear end of a vehicle body or box and said housing having an opening in a wall thereof registering with an opening in the rear wall of the truck body or box, through which openings the auger supporting shaft projects to a suitable bearing mounted within said housing, and a pair of feed wheels or rollers being mounted within the seeder housing for controlling the delivery of seed to the spreaders, said feed rolls having gates for controlling the delivery of seed to the spreaders.

A further object is to provide a seeder attachment of the class described provided with a housing having a pair of feed rolls mounted therein for controlling the delivery of coarse seed, such as oats, wheat, rye, or the like, to the broadcast spreaders, when the seeder attachment is in operation, and an auxiliary hopper being mounted over said housing for supporting small seeds such as grass and clover seeds, said auxiliary hopper having conduits for conducting the seed therefrom to the spreaders, whereby grass seed may be planted independently of the grain seeder, and means being provided in said seeder attachment for controlling the delivery of the grass seed to the spreaders, whereby the apparatus, as a whole, may be utilized for simultaneously planting grass seed and grain, as is common practice with many farmers, particularly when it is desired to convert a section of land which has been utilized for some time for raising grain crops, to other crops such as hay, alfalfa, or the like.

Other objects of the invention are to provide a self-contained seeder attachment which is very compact and extremely simple and inexpensive in construction, which readily lends itself for mounting upon the rear end wall or gate of a conventional farm wagon box, and when connected to the rear end of the power driven screw-conveyor in the wagon box, the latter may be utilized as a hopper for the grain to be planted, whereby many acres may be planted from each filling of the wagon box, without frequent interruptions for replenishing the seeder with seed, as is necessary when planting the seed with a conventional grain seeder.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Seeder attachment supporting vehicle

Figure 1:
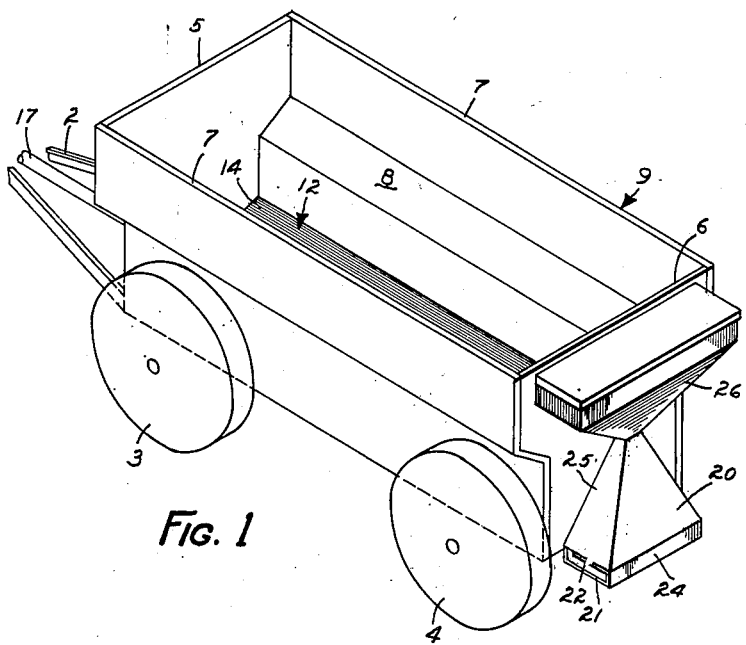
Figure 1 is a perspective view of a vehicle showing the invention applied to the rear end of a conventional wagon box.
Figure 2:
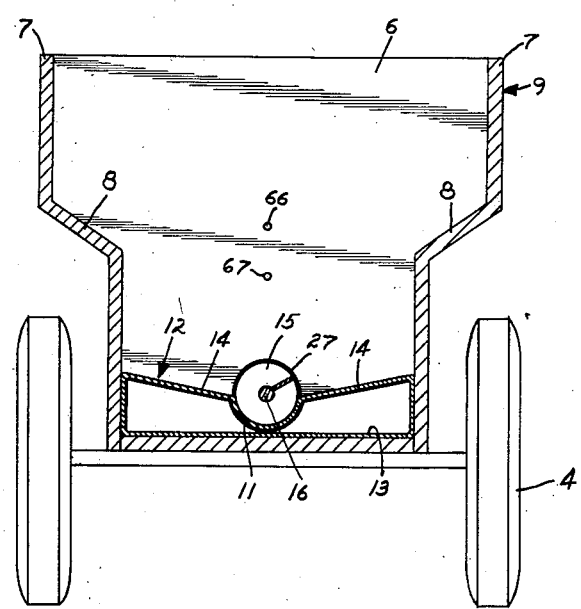
Figure 2 is a cross-sectional view of Figure 1, showing the false bottom and feed screw mounted in the bottom of the wagon box for delivering a constant supply of seed to the seeder attachment.

In the selected embodiment of the invention herein disclosed, there is illustrated in Figures 1 and 2, for purpose of disclosure, a conventional farm wagon including the usual draft member or tongue 2 extending forwardly from the running gear of the wagon and having means (not shown), for coupling it to the tractor to which the wagon may be coupled. The wagon is provided with front and rear carrying wheels 3 and 4 respectively, as best indicated in Figure 1. The body of the vehicle, generally designated by the numeral 9, is in the form of an elongated box having front and rear end walls 5 and 6, and side walls 7.

The side walls are shown provided intermediately of their tops and bottoms with inclined hopper-like wall portions 8, which extend the full length of the box and cooperate to inwardly direct the material towards the center of the box. The wagon may be propelled by a conventional tractor or power unit, not shown in the drawings.

False bottom and screw conveyor

One of the important features of the present invention resides in the means provided in the bottom of the wagon box for rearwardly directing the material to the seeder attachment, subsequently to be described. As best illustrated in Figure 2, an opening 27 is provided in the rear wall 6 of the wagon box, aligned with a longitudinally extending recess or trough 11 provided in a false bottom, generally designated by the numeral 12. The false bottom is preferably hollow, as shown, and has a bottom wall 13, and inclined top wall sections 14, which cooperate to direct the material inwardly into the longitudinal trough 11 which, it will be noted by reference to Figure 3, extends the full length of the wagon box. The false bottom 12 substantially fits the interior of the lower portion of the box, as illustrated in Figures 2 and 3, but is so sized relative to the interior dimensions of the box that it may readily be removed from the box when necessary.

Figure 3:
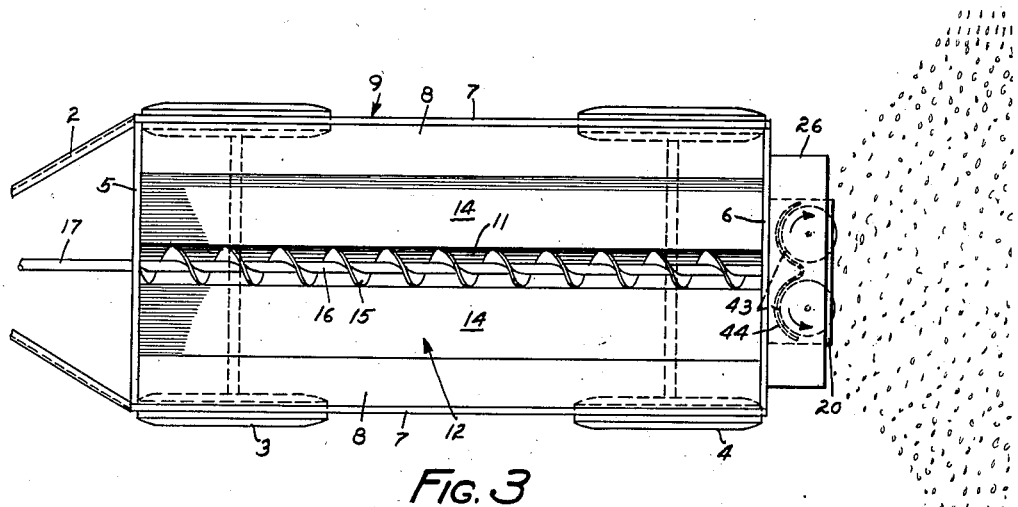
Figure 3 is a plan view of Figure 1.

To constantly feed the material or seed rearwardly to the seeder attachment when the seeder is in operation, a conveyor screw 15 is mounted in the recess 11, as shown in Figures 2 and 3. The conveyor has a shaft 16 supported at the front of the box in a suitable bearing, not shown, and is provided with a shaft extension 17, the forward end of which is provided with means for coupling it to the usual power takeoff shaft of the tractor. The power takeoff shaft, not shown, is usually provided with a suitable clutch whereby the operation of the conveyor 15 may be controlled by manipulation of said clutch.

Main seeder attachment

The seeder attachment herein disclosed is shown provided with a suitable supporting frame, generally designated by the numeral 18, comprising a primary front wall 19, bottom wall 21, and a secondary horizontal wall 22 disposed in parallel relation to the bottom wall 21 and spaced upwardly therefrom, as clearly illustrated in Figures 5, 7, 8 and 9. The wall 22 cooperates with the wall 21 to provide a chamber 23 having a back wall 24. The ends of chamber 23 are shown open to the atmosphere, but may be closed, if desired.

A rear inclined wall 20 and opposed inclined side walls 25 extend from the horizontal wall 22 to a hopper 26 adapted to support various kinds of small grass seeds, clover, buckwheat, flax and the like. The walls 20 and 25 cooperate to conceal the working parts of the main seeder attachment, as clearly illustrated in Figure 1.

Figure 7:
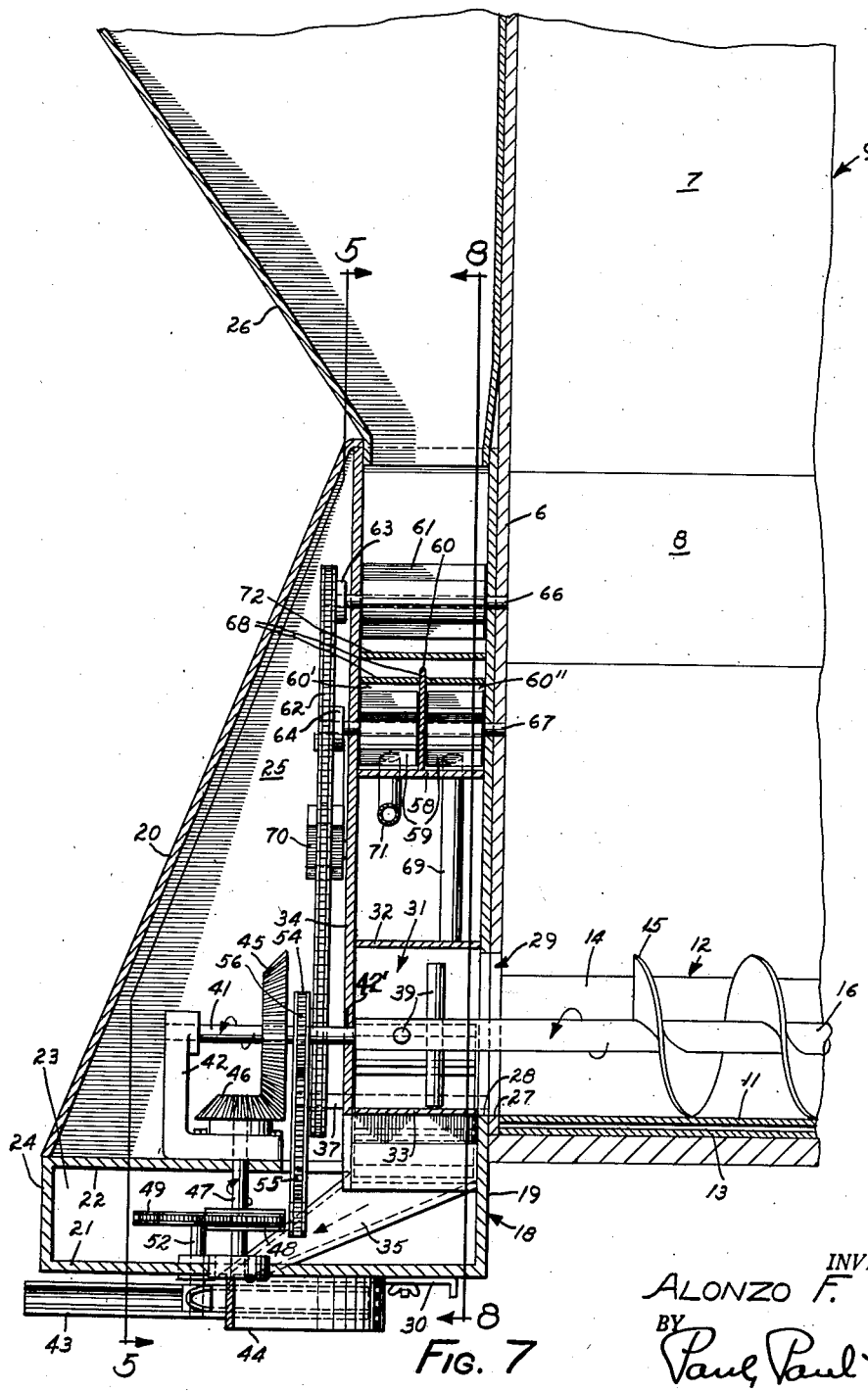
Figure 7 is a sectional elevation on the line 7—7 of Figure 5.

The rear wall 6 of the wagon box is shown having an opening 27 therein which is axially aligned with a similar opening 28 provided in the front wall 19 of the seeder attachment, as best illustrated in Figure 7. The openings 27 and 28 thus cooperate to provide a seed discharge opening 29 for the wagon box, through which the seed contained therein may be discharged to the seeder attachment.

The shaft 16 of the conveyor screw 15 passes through the seed discharge opening 29 into a grain distributing chamber 31, defined by upper and lower walls 32 and 33, a rear wall 34, which preferably extends to the bottom of the small seed hopper 26, as best illustrated in Figure 7. The seed distributing chamber 31 is provided at its ends with downwardly inclined spouts 35 having their upper ends in communication with the chamber 31 and their lower ends received in openings provided in the bottom wall 21 of the supporting bracket 18, as shown in Figure 9. Feed wheels 36 are provided within the chamber 31 and are mounted for rotation in opposite directions, as indicated by the arrows in Figure 8. The feed wheels are secured to shafts 37 mounted in suitable bearings provided in the walls 19 and 34, shown in Figure 7. Suitable slides 38 are movably supported in guides provided in the walls of the chamber 31 whereby the gaps G provided between the lower edges of the slides 38 and the bottom wall 33 of the chamber 31, may be varied to regulate the delivery of seed to the spreader mechanism, subsequently to be described. The discharge ends of the spouts 35 may be varied in size by suitable slides 38, adjustably mounted on the bottom wall 21, as shown in Figure 9.

Agitators 39 are secured to the conveyor shaft 16 within the chamber 31, and cooperate to constantly agitate the material therein, when the attachment is in operation, thereby to prevent the seed from becoming clogged within the chamber 31, as might be possible under certain conditions. The rear end of the conveyor shaft 16 is shown having a reduced extension 41 mounted in a pedestal type bearing or standard 42, and a suitable bearing 42' is provided in the wall 34, as shown in Figure 7.

Rotary spreaders

The means provided for broadcasting the seed over the surface of the ground is shown comprising a pair of rotary spreaders, generally designated by the numeral 43. The spreaders are located directly beneath the bottom wall 21 of the supporting frame 18, and the seed is delivered to the central portions of the spreaders 43 by the spouts 35, as best shown in Figure 9. By thus delivering the seed adjacent to the centers of the two spreaders, the seed is picked up by the radial arms of the spreaders and outwardly cast in a horizontal direction over a wide area. The radial arms of the spreaders 43 are preferably U-shaped in cross section, whereby they readily pick up the seed and throw it outwardly over the ground, as indicated in Figure 3.

Figure 4:
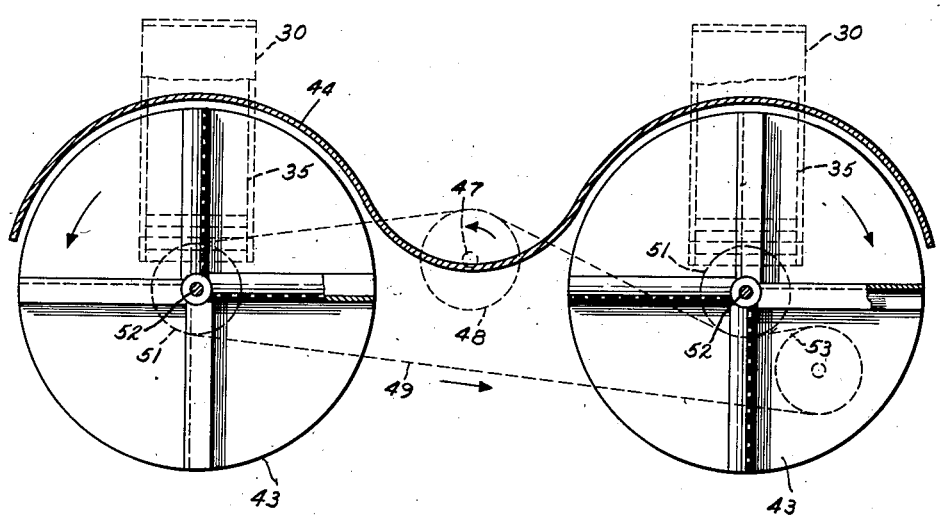
Figure 4 is an enlarged detail sectional view on the line 4—4 of Figure 5, showing the means provided forwardly of the rotary spreaders for preventing the seed from being thrown forwardly by the spreaders.

A vertically disposed guard 44, preferably shaped as shown in Figure 4, is secured to and extends downwardly from the bottom wall 21 of the supporting frame 18 and serves to prevent the seed from being thrown forwardly against the wheels and running gear of the wagon, when the seeder is in operation.

Drive for main seeder

The drive for the main seeder, including the spreaders 43, is shown comprising a pair of bevel gears 45 and 46, the gear 45 being secured to the shaft extension 41 of the feed screw 15, and the gear 46 being secured to an upright shaft 47 mounted in suitable bearings, not disclosed in detail in the drawings. A sprocket wheel 48 is secured to the shaft 47 and has a chain 49 drivingly engaging sprockets 51 secured to the shafts 52—52 of the spreaders 43—43, as will be understood by reference to Figures 9 and 4. An idler sprocket 53 is adjustably mounted in the supporting frame 18, and has a running connection with the chain 49 to maintain said chain at the proper operating tension.

The feed wheels 36 are driven by a chain 54 having a running connection with sprockets 55 mounted on the shafts 37 of the feed wheels 36. The chain 54 also has a running connection with a relatively smaller drive sprocket 56 secured to the shaft extension 41 of the feed screw 15, as will best be understood by reference to Figures 5, 7 and 9. To take up slack in the chain 54, an idler sprocket 57, having a running connection with said chain 54, is shown mounted on a bracket 58, adjustably secured to the bottom wall 21, by suitable means not shown.

Figure 8:
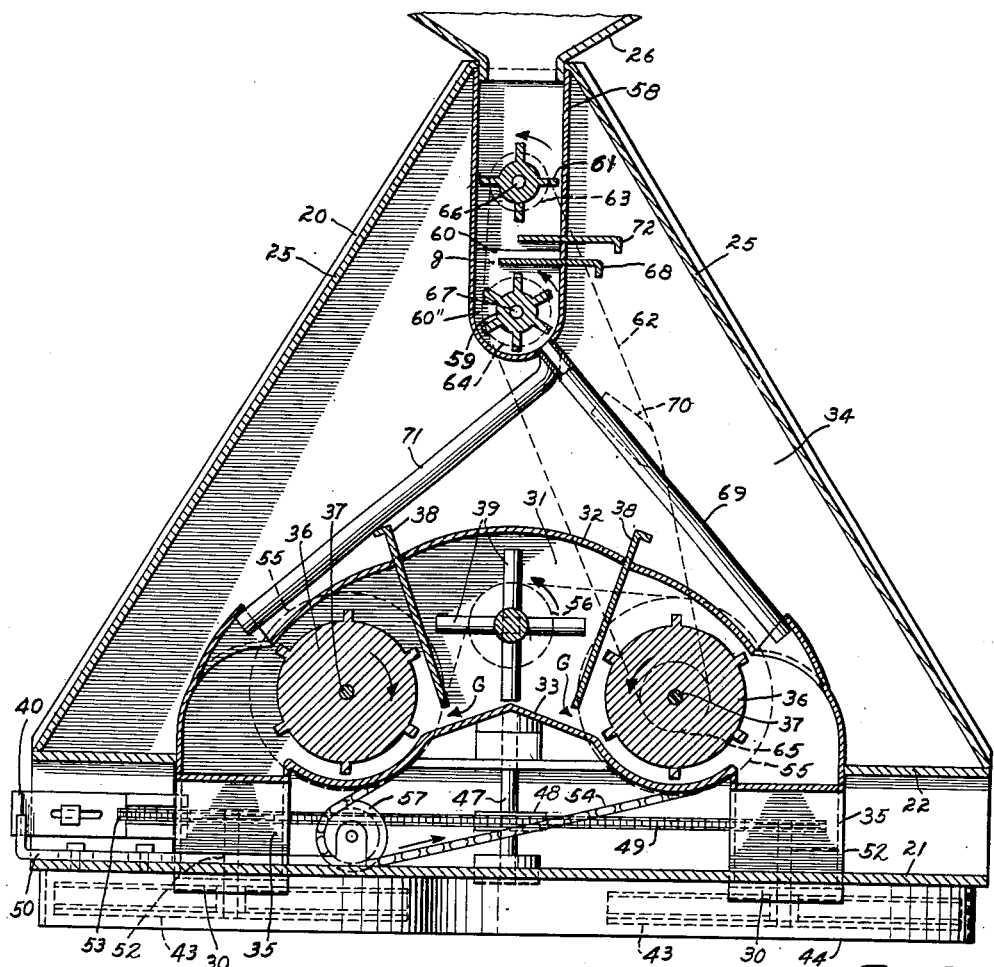
Figure 8 is a sectional view on the line 8—8 of Figure 7 showing the means for controlling the feeding of the seeds to the rotary spreaders.
Figure 9:
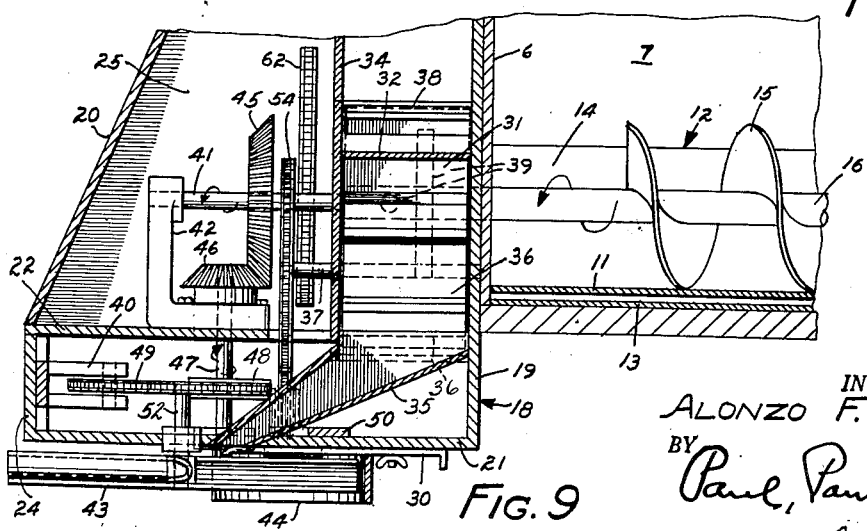
Figure 9 is a detail sectional view on the line 9—9 of Figure 5 showing one of the seed spouts for delivering the coarser seeds or grain from the conveyor to the rotary spreaders.

From the foregoing it will thus be noted that when the feed screw 15 is rotated, the drive chain 54 is driven to simultaneously rotate the feed wheels 36 in opposite directions, as indicated by the arrows in Figure 8. At the same time, the horizontal chain 49 is operated to drive the spreaders 43 as a result of the chain 49 operatively engaging the drive sprocket 48, indicated in dotted lines in Figure 4.

Grass seeder

The means for planting grass seeds or other small seeds is shown comprising a small housing 58 having a partition 60 in its lower portion for dividing it into dual hoppers 60' and 60'', as best shown in Figure 7. Feed wheels 59 are mounted in the hoppers 60' and 60'', and an agitator 61 is shown mounted within the housing 58 above the partition 60. The feed wheels 59 and agitator 61 are driven simultaneously in the same direction by a chain 62 having running connections with sprockets 63, 64, 65, secured respectively to shafts 66, 67, and 37, as clearly indicated in Figures 5 and 8.

Figure 5:
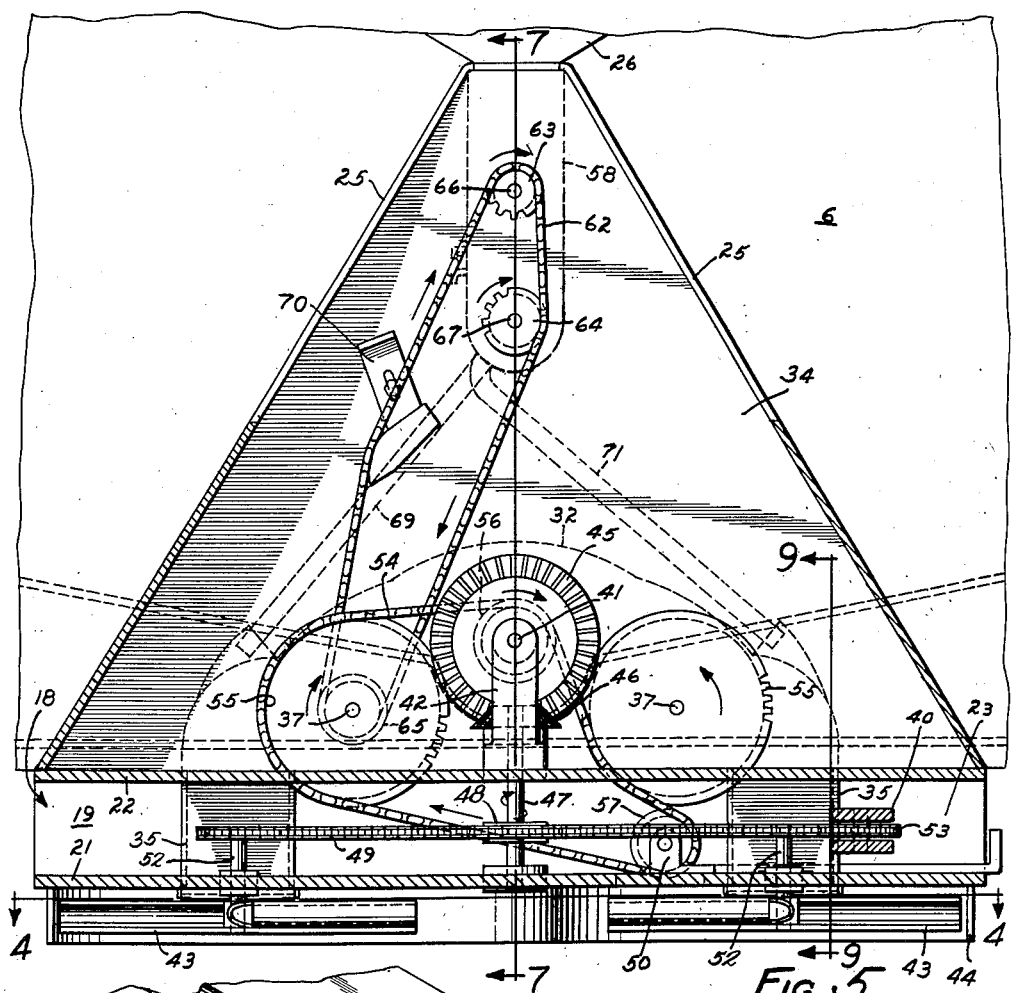
Figure 5 is a detail sectional view substantially on the line 5—5 of Figure 7, showing the various drives of the apparatus.
Figure 6:
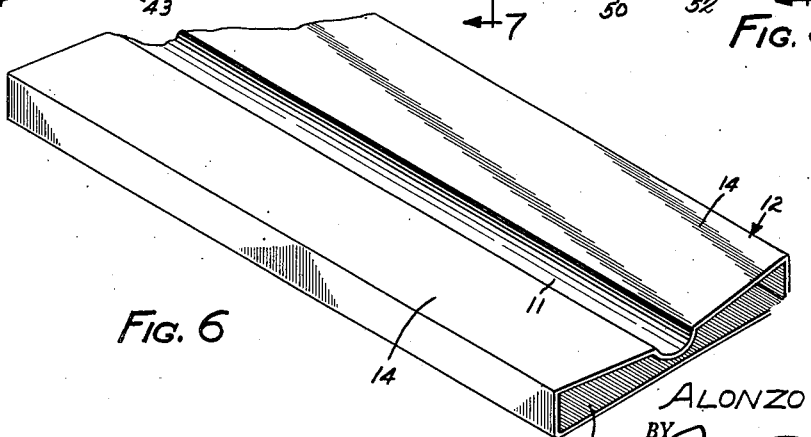
Figure 6 is a perspective view of one end of the false bottom removed from the wagon box.

To maintain the chain 62 at the proper operating tension, a block 70 is shown adjustably mounted on the upright wall 34 whereby it may operatively engage an adjacent run of the chain 62, as shown in Figure 5, thereby to take up slack in said chain 62.

Slide valves 68 are provided in the upper portion of hoppers 60' and 60'' for controlling the flow of seed therefrom to the rotary spreaders 43 through conduits 69 and 71 having their lower ends arranged to discharge the seed into the spouts 35 of the main seeder, as will readily be understood by reference to Figures 7 and 8. A slide 72 is shown mounted over the slides 68 for controlling the delivery of seed into the hoppers 60' and 60'' from the grass seed supply hopper 26, as will be understood by reference to Figure 8.

Operation

The novel feeder attachment herein disclosed has proven very practical and efficient in actual operation. It presents the utmost in simplicity, and may be constructed as an integral unit, whereby it may readily be attached to a conventional wagon box in a minimum of time, thereby to condition the wagon, when coupled to a tractor, into a seeder for planting various kinds of small seeds. When a field is to be planted with grain, such as oats, wheat, rye, or the like, the wagon box, which may have a capacity of approximately one hundred bushels, or more, is filled with grain and the operator then starts the planting operation by drivingly engaging the conveyor shaft end 17 with the power takeoff shaft of the tractor by manipulation of the usual clutch provided on the tractor for that purpose. Rotation of the conveyor shaft causes the screw conveyor 15 to rotate and drive the agitator 39 and feed wheels 36, whereupon grain is delivered into the spouts 35 which discharge the grain into the center of the spreaders 43. The spreaders, as hereinbefore stated, outwardly throw the grain over the surface of the field in a uniform covering, as indicated in Figure 3, thereby assuring a uniform crop growth.

Because the entire capacity of the wagon box may be utilized for supporting grain to be planted, it will readily be seen that a much larger acreage may be planted with each filling of the wagon box, than would be possible with a conventional seeder, thereby effecting a considerable saving in labor and maintenance costs.

By utilizing the wagon box as a supply hopper for the seeder attachment, a single operator may readily manipulate the apparatus without discomfort and fatigue, because the frequent handling of filled bags of grain, as when periodically filling the hopper of a conventional seeder may be disposed with. With the apparatus herein disclosed, the operator may return to a loading platform or granary for refilling the wagon box hopper, when it becomes necessary to refill. Actual work in the field has proven the present seeder very practical and efficient in operation. Because of its inherent construction in combination with its relatively large grain or seed storage hopper, the apparatus may be operated at a comparatively high rate of speed, whereby the time required to plant a given number of acres within a certain time period may be greatly reduced, as compared to the time required to plant the same acreage with a conventional seeder, resulting in a corresponding reduction in the cost of planting the field.

If desired, a suitable coupling may be provided in the conveyor shaft 16, or the relatively smaller shaft extension 41 thereof may be detachably coupled to the relatively larger conveyor shaft 16 to permit convenient detachment of the apparatus from the wagon box or for mounting it thereon as will be understood. The slides 38 of the main seeder provide convenient controls for the delivery of seed to the spreaders, and when it is desired to interrupt the seeding operation, the slides or gates 38 may be closed, whereby the seed cannot discharge from the chamber 31 to the delivery spouts 35.

In the operation of the seeder, the flow of seed from the hopper 26 to the spreaders is controlled by the delivery of seed through the gap g provided between the one end of the lower slide 69 and the adjacent wall of the housing 58. There may be instances when it may be deemed advisable to plant grass seed simultaneously with the planting of grain, as when it is desired the next season's crop shall be hay. Such simultaneous planting of grain and grass seed may readily and efficiently be accomplished with the present seeder attachment, as hereinbefore stated. The inclined walls 20 and 25 are preferably detachably supported on the apparatus, whereby they may readily be detached when necessary to gain access to the seeder mechanism and its various drives.

The foregoing detailed description has been given for clearness of understanding only, and no unnecessary limitations should be understood therefrom, but the appended claims should be construed as broadly as permissible in view of the prior art.

I claim as my invention:

1. A seeder attachment comprising a supporting frame having means for mounting it on the rear end wall of a vehicle body and having a housing thereon providing a seed distributing chamber which is in communication with the interior of the wagon box through an opening in the rear wall thereof, a feed screw in the bottom of the wagon box extending the length thereof and having means at its forward end for coupling it to the usual drive shaft of a tractor, the rear end of the conveyor shaft extending into said seed distributing chamber, an agitator secured to said shaft within said chamber, a pair of spaced parallel feed wheels in said chamber disposed at opposite sides of the conveyor shaft, means operatively connecting the feed wheels to said shaft for rotation in opposite directions, and a pair of rotary spreaders arranged to receive the seed or grain from said feed wheels and outwardly broadcast the seed in a horizontal direction, thereby to uniformly spread the seed over the surface of ground.

2. A unitary seeder attachment comprising a housing including an upright wall having means for securing it to the rear wall of a vehicle grain box provided with means for feeding grain therefrom into a seed distributing chamber defined by the walls of said housing, a discharge spout at each end of said chamber, a pair of cylindrical feed wheels in said chamber having circumferentially spaced ribs on their peripheries, means for driving said wheels in opposite directions, whereby they may simultaneously discharge grain from said chamber into their respective spouts at a uniform rate, a spreader disposed beneath each spout for receiving and broadcasting the grain received from said spouts, said spreaders being secured to a pair of vertically disposed shafts having a driving connection with said feed wheels, whereby said spreaders are rotated in opposite directions and simultaneously with the feed wheels.

3. An attachment for planting grain and grass seeds comprising a housing having means for securing it to the rear wall of a vehicle body adapted to support a supply of grain, a feed screw for feeding grain from the vehicle body to said housing, power means for driving the feed screw, a pair of feed wheels in said housing disposed in spaced parallel relation, downwardly inclined spouts at the ends of said housing for conducting grain from the housing to a pair of laterally spaced spreaders, means for driving said spreaders in opposite directions and simultaneously with said feed wheels, a grass seed hopper mounted over said housing and having a pair of conduits connecting the bottom thereof to the upper ends of said spouts, a feed wheel in said hopper for feeding grass seed to said spouts, a chain drive connecting said grass seed feed wheel to the grain feed wheels for simultaneous operation therewith, and valve means for controlling the flow of grain and grass seed to said spouts and whereby the attachment may be utilized for planting all known varieties of grain and relatively smaller seeds such as various kinds of grass seeds, either simultaneously or independently of one another.

4. In an attachment for planting grain and grass seeds comprising a supporting wall adapted to be secured to the end wall of a vehicle box adapted to contain a supply of grain, upper and lower wall members secured to said supporting wall and extending rearwardly therefrom and having a vertically disposed rear wall secured thereto and cooperating with said top and bottom wall members and said supporting wall to provide a grain receiving and distributing chamber, said supporting wall having an opening therein, a feed screw in the bottom of the vehicle box having a shaft extending through said opening into said distributing chamber, an agitator secured to said shaft within said chamber and rotatable therewith, a downwardly directed spout at each end of said chamber, a pair of cylindrical feed wheels mounted adjacent to the ends of said chamber and disposed in spaced parallel relation, shafts supporting said feed wheels with their rear end portions extending rearwardly of the rear wall of said chamber, valve means in said chamber for controlling the delivery of grain to said feed wheels, a seed hopper having its lower portion secured to said supporting wall above the grain distributing chamber, a feed wheel in the lower portion of said hopper having a shaft extending through the rear wall of the hopper, an agitator in the upper portion of said hopper, valve means in said hopper between the feed wheel and agitator therein for regulating the flow of seed from said hopper, a pair of conduits having their upper ends in communication with the bottom of said hopper and having their lower ends in communication with said grain spouts, a pair of spreaders mounted beneath said spouts for receiving and broadcasting seed received from said spouts, said spreaders being operatively connected together for rotation in opposite directions, and a plurality of inter-connected drives for simultaneously driving said feed wheels, agitators, and spreaders from the rear end of the conveyor shaft.

5. An attachment according to claim 4, wherein a partition divides the lower portion of the seed hopper into two separate compartments each having a feed wheel mounted therein, and said feed wheels being secured to a common shaft, and each of said compartments having one end of one of said conduits connected thereto.

ALONZO F. TREES.

REFERENCES CITED

The following references are of record in the file of this patent:

UNITED STATES PATENTS

| Number | Name | Date |
| --- | --- | --- |
| 1,000,004 | Huber | Aug. 8, 1911 |
| 1,231,269 | Kindling | June 26, 1917 |
| 1,776,751 | Ditto | Sept. 23, 1930 |
| 1,912,172 | Bailey | May 30, 1933 |
| 2,200,165 | Fulkerson et al. | May 7, 1940 |
| 2,323,262 | Warren | June 29, 1943 |